United States Patent
Panchal et al.

(10) Patent No.: US 10,193,703 B2
(45) Date of Patent: Jan. 29, 2019

(54) SYSTEMS AND METHODS FOR AGGREGATING AN ENHANCED MULTIMEDIA BROADCAST MULTICAST SERVICE OVER MULTIPLE FREQUENCY CARRIERS

(71) Applicant: INTEL IP CORPORATION, Santa Clara, CA (US)

(72) Inventors: Ajay Panchal, Manalapan, NJ (US); Stefan Strobl, Obermichelbach (DE); Birgit Breining, Munich (DE)

(73) Assignee: INTEL IP CORPORATION, Santa Clara, CA (US)

( * ) Notice: Subject to any disclaimer, the term of this patent is extended or adjusted under 35 U.S.C. 154(b) by 266 days.

(21) Appl. No.: 14/976,240

(22) Filed: Dec. 21, 2015

(65) Prior Publication Data
US 2016/0241412 A1    Aug. 18, 2016

Related U.S. Application Data

(60) Provisional application No. 62/115,498, filed on Feb. 12, 2015.

(51) Int. Cl.
*H04L 12/18* (2006.01)
*H04W 4/06* (2009.01)
*H04L 5/00* (2006.01)
*H04W 4/38* (2018.01)
*H04W 72/00* (2009.01)

(52) U.S. Cl.
CPC .............. *H04L 12/189* (2013.01); *H04L 5/00* (2013.01); *H04W 4/06* (2013.01); *H04W 4/38* (2018.02); *H04W 72/005* (2013.01)

(58) Field of Classification Search
CPC .......... H04L 12/189; H04L 5/00; H04W 4/06; H04W 4/006
See application file for complete search history.

(56) References Cited

U.S. PATENT DOCUMENTS

| | | | |
|---|---|---|---|
| 2012/0236776 A1* | 9/2012 | Zhang | H04W 48/12 370/312 |
| 2013/0044670 A1 | 2/2013 | Jang et al. | |
| 2013/0258934 A1* | 10/2013 | Amerga | H04W 72/00 370/312 |
| 2013/0294318 A1 | 11/2013 | Amerga et al. | |
| 2014/0105095 A1 | 4/2014 | Lee et al. | |

(Continued)

FOREIGN PATENT DOCUMENTS

| EP | 2632183 A1 | 8/2013 |
|---|---|---|
| WO | 2014065997 A1 | 5/2014 |

OTHER PUBLICATIONS

PCT/US2016/012867, International Search Report and Written Opinion, dated Apr. 14, 2016, 14 pages.

*Primary Examiner* — Christine Ng
(74) *Attorney, Agent, or Firm* — Stoel Rives LLP

(57) ABSTRACT

Systems and methods distribute an evolved multimedia broadcast multicast service over multiple frequency carriers. A user equipment determines a plurality of available cells in a wireless network through which respective portions of evolved multimedia broadcast multicast service are broadcast, connects to the plurality of available cells, and aggregates data from the plurality of available cells to receive the evolved multimedia broadcast multicast service.

9 Claims, 5 Drawing Sheets

(56) References Cited

U.S. PATENT DOCUMENTS

| | | | | |
|---|---|---|---|---|
| 2014/0119263 A1* | 5/2014 | Shauh | ............ | H04W 72/005 370/312 |
| 2014/0119265 A1* | 5/2014 | Shauh | ............ | H04W 4/06 370/312 |
| 2014/0146737 A1 | 5/2014 | Ohshima et al. | | |
| 2015/0049600 A1* | 2/2015 | Balasubramanian | ............ | H04W 76/028 370/216 |
| 2015/0237671 A1* | 8/2015 | Wu | ............ | H04W 76/043 370/328 |
| 2016/0105880 A1* | 4/2016 | Bao | ............ | H04L 12/189 370/312 |

* cited by examiner

SYSTEMS AND METHODS FOR AGGREGATING AN ENHANCED MULTIMEDIA BROADCAST MULTICAST SERVICE OVER MULTIPLE FREQUENCY CARRIERS

RELATED APPLICATION

This application claims the benefit under 35 U.S.C. § 119(e) of U.S. Provisional Application No. 62/115,498, filed Feb. 12, 2015, which is hereby incorporated by reference herein in its entirety.

TECHNICAL FIELD

This disclosure relates generally to wireless communication systems, and more particularly, to distributing an enhanced multimedia broadcast multicast service (eMBMS) over multiple frequency carriers.

BACKGROUND INFORMATION

Wireless mobile communication technology uses various standards and protocols to transmit data between a base station and a mobile communication device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as WiMAX (Worldwide Interoperability for Microwave Access); and the IEEE 802.11 standard, which is commonly known to industry groups as WiFi. In 3GPP radio access networks (RANs) in LTE systems, the base station can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs) in an UTRAN or E-UTRAN, which communicates with the mobile communication device, known as user equipment (UE). A downlink (or DL) transmission can be a communication from the base station (or eNB) to the mobile communication device (or UE), and an uplink (or UL) transmission can be a communication from the mobile communication device to the base station.

LTE systems provide, in addition to unicast transmissions, support of MBMS broadcast services. The MBMS in LTE-Advanced (LTE-A) is typically provided in a synchronized network by the simultaneous transmission of the same information from multiple transmission points or cells using the same carrier frequency in a multicast broadcast single frequency network (MBSFN) area.

DETAILED DESCRIPTION

In LTE systems, eMBMS services share bandwidth with unicast services. Therefore, a particular frequency carrier may not have enough bandwidth allocation available for eMBMS services. Thus, according to certain embodiments disclosed herein, LTE networks distribute data of a particular eMBMS service over multiple frequency carriers. In one embodiment, for example, a network node sends information to a UE indicating how a temporary mobile group identity (TMGI) is distributed over multiple frequencies. The TMGI corresponds to a particular eMBMS service. The UE aggregates data received over multiple frequencies for the particular TMGI so as to successfully receive the corresponding eMBMS service.

Figure 1:
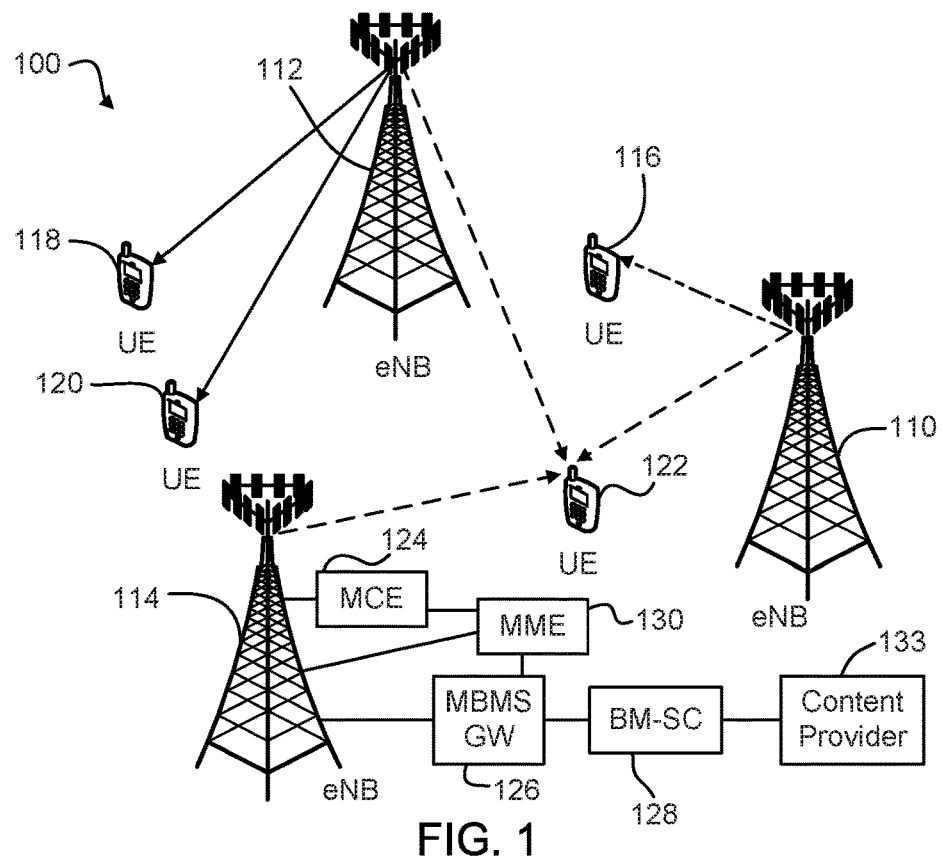
FIG. 1 is a block diagram of a wireless communication system configured to provide eMBMS according to certain example embodiments.

FIG. 1 is a block diagram of a wireless communication system 100 configured to provide eMBMS service according to certain example embodiments. The wireless communication system 100 includes a first eNB 110, a second eNB 112, and a third eNB 114. The first eNB 110 provides a unicast transmission to a UE 116 within its cell coverage area. In the example shown in FIG. 1, a UE 122 is in an MBSFN area serviced by the first eNB 110, the second eNB 112, and the third eNB 114. Although not shown, other UEs may also receive the MBMS transmissions within the MBSFN area.

Because the same data transmission in MBSFN is performed by multiple cells or transmission points (i.e., the eNBs 110, 112, 114), the resource allocation and transport block format (e.g., modulation and coding scheme (MCS) and transport block size (TBS)) are not changed dynamically by one of the eNBs 110, 112, 114, and instead are decided by a multicast coordination entity (MCE) 124 on a long-term basis. The MCE 124 may be part of the eNB 114 or may be implemented by one or more servers or devices in an evolved packet core (EPC) of the wireless communication system 100. Persons skilled in the art will recognize from the disclosure herein that some or all of the functions of the MCE 124 described herein may be performed by one or more other entities within the EPC (e.g., an MBMS gateway (GW) 126 or broadcast multicast service center (BM-SC) 128) and/or by one or more of the eNBs 110, 112, 114.

The MBMS GW 126 distributes MBMS user plane data to the eNBs 110, 112, 114 and performs MBMS session control signaling toward the E-UTRAN via a mobile management entity (MME) 130. The BM-SC 128 receives broadcast or multicast content from a content provider 133 and may provide functions such as membership, session and transmission, proxy and transport, service announcement, and content synchronization. For simplicity, the embodiment shown in FIG. 1 illustrates the MCE 124, MBMS GW 126, and MME 130 in communication only with the third eNB 114. In certain embodiments, for example, messages to and from the MCE 124 may be communicated between the eNBs 110, 112, 114 (e.g., through an X2 interface). Persons skilled in the art will recognize from the disclosure herein, however, that the MCE 124, MBMS GW 126 and/or MME 130 may communicate directly with any or all of the eNBs 110, 112, 114.

In certain embodiments disclosed herein, the UE 122 is carrier aggregation (CA) enabled and is configured to aggregate an eMBMS service from a plurality of specified available frequencies. Current LTE systems do not specify a method to distribute one eMBMS service (i.e., TMGI) across multiple frequency carriers. For example, if an eMBMS service requires a specific amount of data (per time-period) to be transmitted on a current LTE broadcast network, a cell from a particular frequency carrier (c1-f1) may not have enough bandwidth allocation available for that eMBMS service. Whereas, if there is another cell (e.g., corresponding to the eNB 112) with a different frequency carrier (c2-f2) is available, then the bandwidth could be allocated for remaining data from that eMBMS service (as in embodiments disclosed herein). However, current LTE networks are not be able to support distribution of that eMBMS service on two different cells from two frequency carriers (c1-f1 and c2-f2), and hence the support of that eMBMS service may not be available from that LTE network given the bandwidth availability from particular frequency carriers. Thus, according to certain embodiments disclosed herein, the wireless communication system 100 shown in FIG. 1 is configured to distribute data of a single eMBMS service over multiple frequency carriers to utilize the available bandwidth more efficiently.

Figure 2:
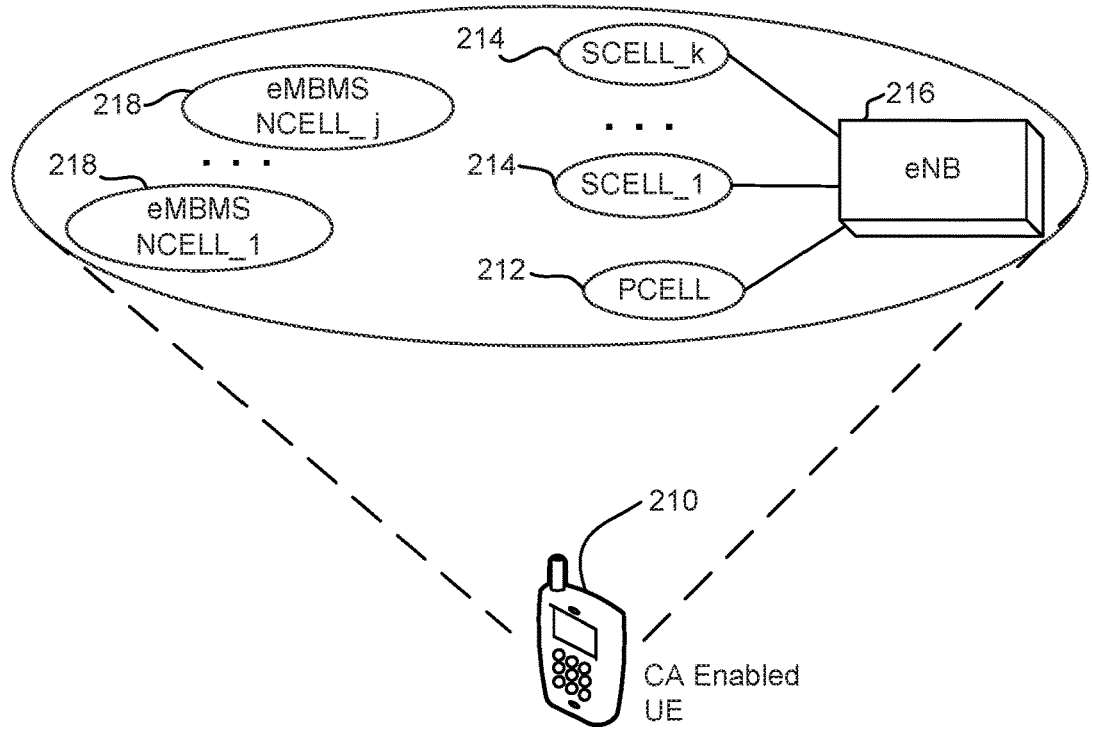
FIG. 2 is a block diagram illustrating a UE configured to perform temporary mobile group identity (TMGI) aggregation from multiple frequency cells according to one embodiment.

FIG. 2 is a block diagram illustrating a UE 210 configured to perform TMGI aggregation from multiple frequency cells according to one embodiment. In this example, the UE 210, which is CA enabled, is configured to communicate with a primary cell (PCELL) 212 and one or more secondary cells 214 (shown as SCELL_1 . . . SCELL_k) corresponding to an eNB 216 in an LTE network. The UE 210 is also configured to communicate with one or more eMBMS neighbor cells 218 (shown as eMBMS NCELL_1 . . . eMBMS NCELL_j) in the LTE network. Further, the UE 210 is configured to aggregate eMBMS services from multiple cells (e.g., belonging to different frequency carriers). Thus, the UE 210 may receive an eMBMS service through any combination of the PCELL 212, the one or more SCELL(s) 214, and the one or more eMBMS NCELL(s) 218. For example, the UE 210 may receive 40% of a particular eMBMS service through the PCELL 212 and 60% of the particular eMBMS service through one of the eMBMS NCELLs 218 (e.g., eMBMS CELL_1). In such embodiments, the LTE network distributes an eMBMS service over multiple frequency carriers, which the UE 210 aggregates at the receiving end so as to successfully receive the eMBMS service.

Figure 3:
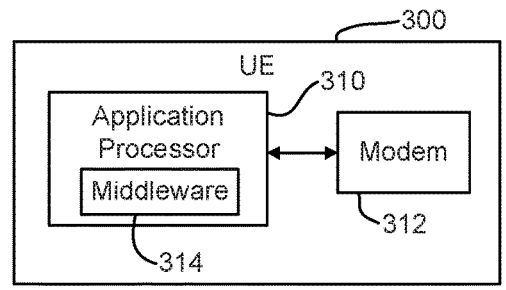
FIG. 3 is a simplified block diagram of a UE configured according to certain embodiments.

Certain embodiments implement aggregating an eMBMS service using a middleware centric or an access stratum centric approach. For example, FIG. 3 is a simplified block diagram of a UE 300 configured according to certain embodiments. The UE 300 includes an application processor 310 and a modem 312. The application processor 310 includes middleware 314 configured to perform, among other things, eMBMS functions. The middleware 314 may be configured, for example, to receive service announcements from the BM-SC 128 shown in FIG. 1. In a middleware centric approach, as discussed below, the middleware 314 may use a modified version of the service announcement to determine a plurality of frequencies for receiving an eMBMS service, and coordinate with the modem 312 to receive the eMBMS service using the indicated frequencies. In other embodiments, the middleware 314 may be part of the modem 312. As also discussed below, other embodiments use an access stratum centric approach wherein the modem 312 receives a control message from the network that indicates the plurality of frequencies used for an eMBMS service.

Figure 4:
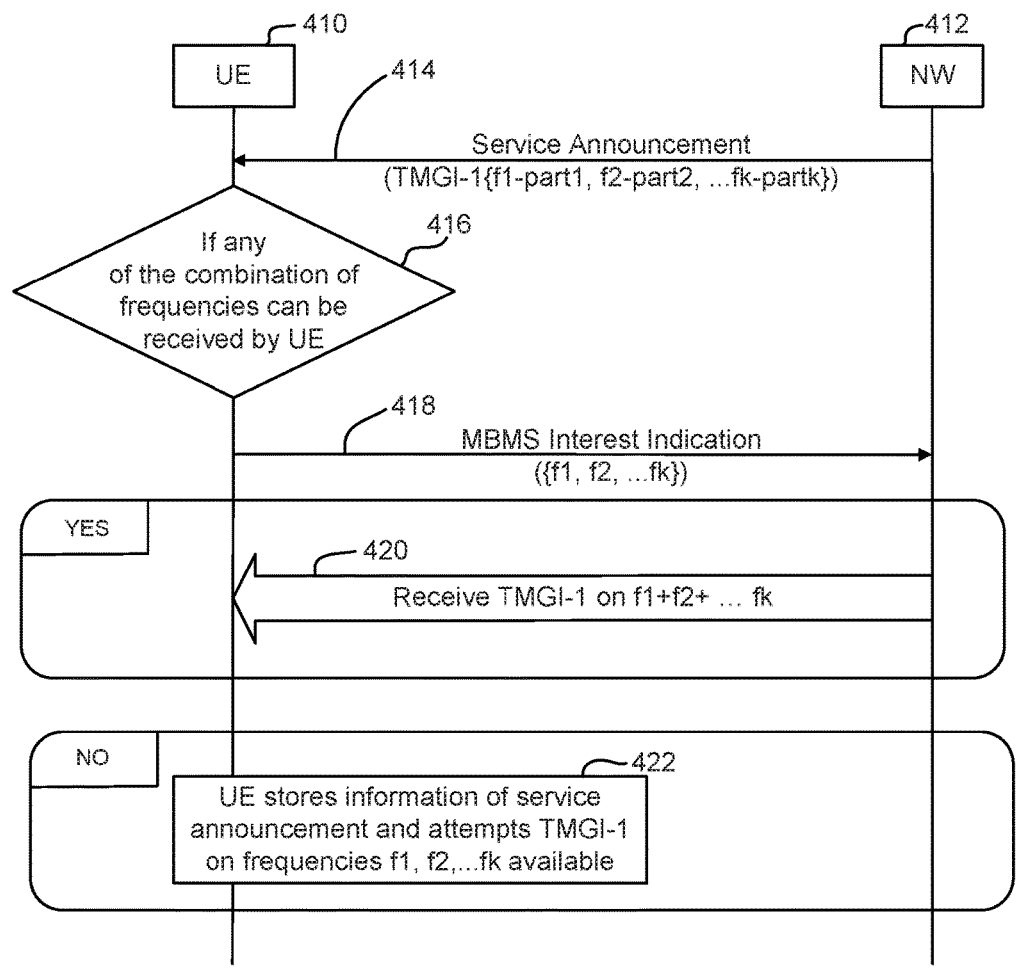
FIG. 4 is a process diagram illustrating TMGI aggregation from multiple frequencies at a UE according to one embodiment.

FIG. 4 is a process diagram illustrating TMGI aggregation from multiple frequencies at a UE 410 according to one embodiment. The example shown in FIG. 4 uses a middleware centric approach wherein the network (NW) 412 sends a service announcement message 414 to the UE 410. As discussed above, the service announcement message 414 may be generated by the BM-SC 128. The service announcement message 414 includes a set of dependent frequency carriers corresponding to a particular TMGI (shown as TMGI-1). Each frequency carrier may be associated with a different part of the TMGI. An example is as follows, where "Earfcn" refers to an evolved absolute radio frequency channel number (EARFCN):

*TMGI-*1:

*Earfcn* #1 – *part* #1-*outof*-*k*

*Earfcn* #2 – *part* #2-*outof*-*k*

. . .

*Earfcn* #*k* – *part* #*k*-*outof*-*k*

*Earfcn* #(*m* + 1) – *part* #1-*outof*-*k*

*Earfcn* #(*m* + 2) – *part* #2-*outof*-*k*

. . .

*Earfcn* #(*m* + *k*) – *part* #*k*-*outof*-*k*

. . .

So on . . .

In this example, TMGI-1 is distributed over "k" frequencies. Thus, as shown in FIG. 4, parts of TMGI-1 are distributed over the set of frequencies {f1-part1, f2-part2, . . . fk-partk}. The NW 412 may dynamically change the number of frequency carriers used based on, for example, load balancing, quality of service (QoS), or other factors. There can be multiple frequency subsets to support a particular TMGI. For example, TMGI-1 may be received over a first frequency subset {f1 to fk} or a second frequency subset {f(m+1) to f(M+k)}.

At power on, the UE 410 may receive system information in a system information block (SIB), such as SIB-15. The system information indicates frequencies and other information (e.g., service area identifiers (SAIs)) to support eMBMS. Using the system information and other factors (e.g., UE supported band combination, service-announcement message etc.), the UE 410 determines 416 whether it can receive any combination of frequencies indicated in the service announcement message 414 so as to receive all parts (i.e., part 1 to part k) of TMGI-1.

In certain embodiments, the UE 410 may also send an MBMS interest indication message 418 to the NW 412 to indicate the UE's interest to receive the MBMS service using particular frequencies (e.g., {f1, f2, . . . fk} or {f(m+1), f(m+2), . . . f(m+k)}). The MBMS interest indication message 418 may also include an indication of which depending carriers should be treated as a bundle. The information in the MBMS interest indication message 418 may assist the NW 412 to keep frequencies of interest available to the UE 410.

If the UE 410 determines 416 it can receive eMBMS from all frequencies in any frequency subset so as to receive TMGI-1 (e.g. {f1 to fk} or {f(m+1) to f(m+k)}), the UE 410 tunes all the frequencies of the subset for eMBMS service and starts receiving data 420 for TMGI-1 from these frequencies. The UE 410 aggregates the data received from these frequencies simultaneously.

If, however, the UE 410 determines it cannot receive eMBMS from any frequency subset required to receive TMGI-1 (e.g. {f1 to fk}), the UE 410 stores 422 information of the service announcement message 414 for future purposes. For example, the UE 410 may later attempt to receive TMGI-1 on frequencies f1, f2, ... fk, if these frequencies become available.

Figure 5:
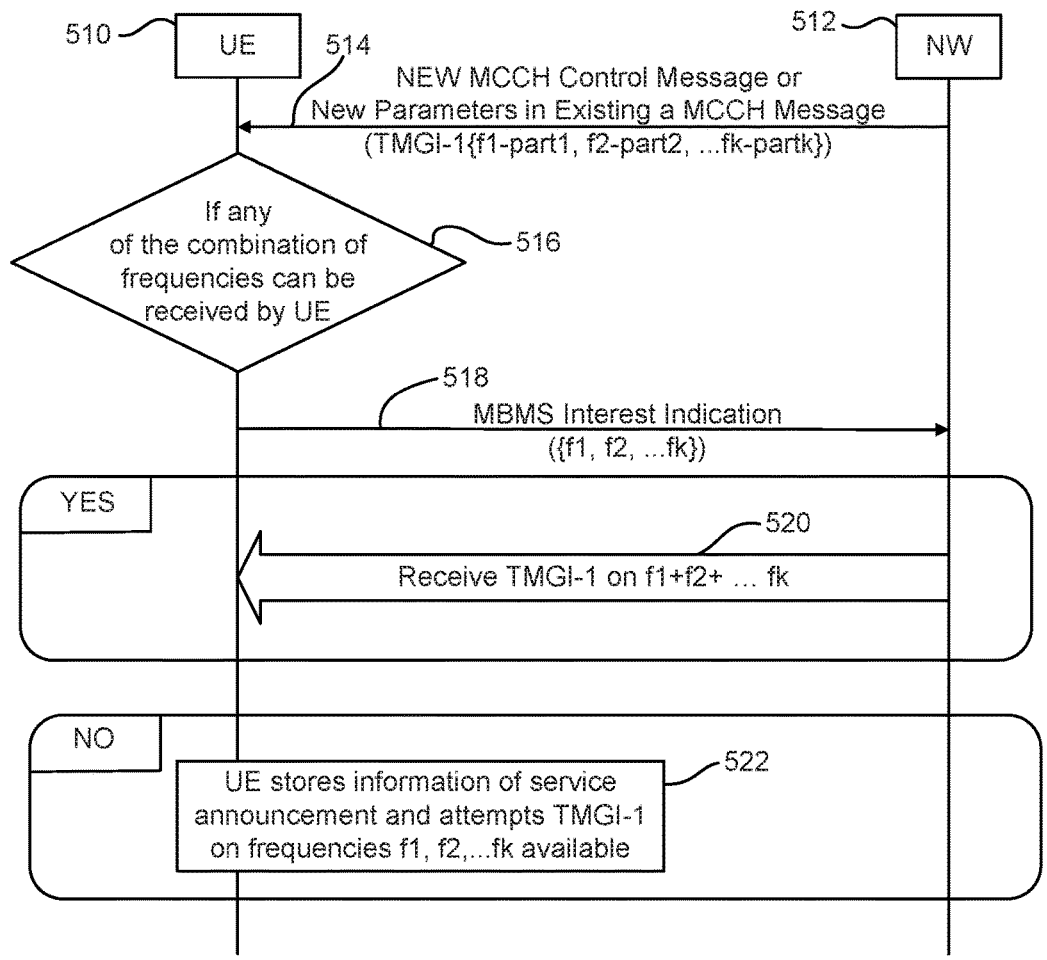
FIG. 5 is a process diagram illustrating TMGI aggregation from multiple frequencies at a UE according to another embodiment.

FIG. 5 is a process diagram illustrating TMGI aggregation from multiple frequencies at a UE 510 according to another embodiment. The example shown in FIG. 5 uses an access stratum centric approach wherein the network (NW) 512 sends a control message 514 in the control plane of the access stratum to the UE 510. The control message 514 may include, for example, a new multicast control channel (MCCH) message, or new parameters in an existing MCCH message, that includes a set of dependent frequency carriers corresponding to TMGI-1. Each frequency carrier may be associated with a different part of the TMGI.

In this example, TMGI-1 is distributed over "k" frequencies. Thus, as shown in FIG. 5, parts of TMGI-1 are distributed over the set of frequencies {f1-part1, f2-part2, ... fk-partk}. The NW 512 may dynamically change the number of frequency carriers used based on, for example, load balancing, quality of service (QoS), or other factors. There can be multiple frequency subsets to support a particular TMGI. For example, TMGI-1 may be received over a first frequency subset {f1 to fk} or a second frequency subset {f(m+1) to f(M+k)}.

At power one, the UE 510 may receive system information in a system information block (SIB), such as SIB-15. The system information indicates frequencies and other information (e.g., service area identifiers (SAIs)) to support eMBMS. Using the system information and other factors (e.g., UE supported band combination, service-announcement message etc.), the UE 510 determines 516 whether it can receive any combination of frequencies indicated in the control message 514 so as to receive all parts (i.e., part 1 to part k) of TMGI-1.

In certain embodiments, the UE 510 may also send an MBMS interest indication message 518 to the NW 512 to indicate the UE's interest to receive the MBMS service using particular frequencies (e.g., {f1, f2, ... fk} or {f(m+1), f(m+2), ... f(m+k)}). The MBMS interest indication message 518 may also include an indication of which depending carriers should be treated as a bundle. The information in the MBMS interest indication message 518 may assist the NW 512 to keep frequencies of interest available to the UE 510.

If the UE 510 determines 516 it can receive eMBMS from all frequencies in any frequency subset so as to receive TMGI-1 (e.g. {f1 to fk} or {f(m+1) to f(m+k)}), the UE 510 tunes all the frequencies of the subset for eMBMS service and starts receiving data 520 for TMGI-1 from these frequencies. The UE 510 aggregates the data received from these frequencies simultaneously.

If, however, the UE 510 determines it cannot receive eMBMS from any frequency subset required to receive TMGI-1 (e.g. {f1 to fk}), the UE 510 stores 522 information of the control message 514 for future purposes. For example, the UE 510 may later attempt to receive TMGI-1 on frequencies f1, f2, ... fk, if these frequencies become available.

In addition, or in other embodiments, the access stratum centric solution shown in FIG. 5 may apply radio link control (RLC) techniques like segmentation/re-segmentation in combination with a re-ordering window or only a re-ordering window (without segmentation/re-segmentation) to aggregate the eMBMS data packets on the access stratum. Further, a SIB (e.g., SIB-15) may include supportive information on aggregation dependencies that are used, e.g., for re-selection purposes. In case aggregation is used as a generic scheme, i.e., applicable for all TMGIs, then the UE 510 may camp immediately on the relevant carriers without having read TMGI related aggregation information from the MCCH (or the service announcement for the example shown in FIG. 4).

Figure 6:
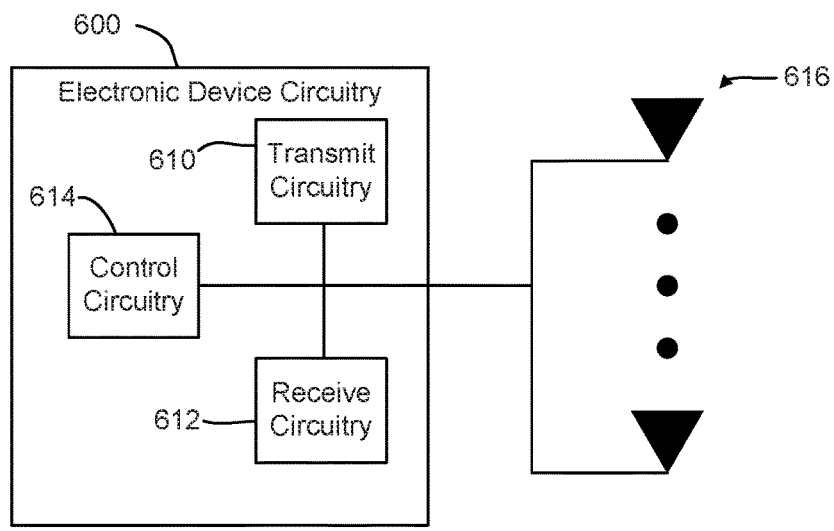
FIG. 6 is a block diagram illustrating electronic device circuitry that may be eNB circuitry, UE circuitry, network node circuitry, or some other type of circuitry in accordance with various embodiments.

FIG. 6 is a block diagram illustrating electronic device circuitry 600 that may be eNB circuitry, UE circuitry, network node circuitry, or some other type of circuitry in accordance with various embodiments. In embodiments, the electronic device circuitry 600 may be, or may be incorporated into or otherwise a part of, an eNB, a UE, a network node, or some other type of electronic device. In embodiments, the electronic device circuitry 600 may include radio transmit circuitry 610 and receive circuitry 612 coupled to control circuitry 614. In embodiments, the transmit circuitry 610 and/or receive circuitry 612 may be elements or modules of transceiver circuitry, as shown. The electronic device circuitry 610 may be coupled with one or more plurality of antenna elements 616 of one or more antennas. The electronic device circuitry 600 and/or the components of the electronic device circuitry 600 may be configured to perform operations similar to those described elsewhere in this disclosure.

In embodiments where the electronic device circuitry 600 is or is incorporated into or otherwise part of a UE, the receive circuitry 612 may be to receive, from an evolved NodeB (eNB) of a long term evolution (LTE) network, an indication of a plurality of frequencies on which respective portions of an enhanced multimedia broadcast multicast service (eMBMS) temporary mobile group identity (TMGI) may be transmitted. The control circuitry 614 may be to identify which frequencies the UE can receive. For example, the control circuitry 614 may identify whether the UE can receive two or more frequencies of the plurality of frequencies. The control circuitry 614 may be further to store, if the UE cannot receive the eMBMS, the indication of the plurality of frequencies. The transmit circuitry 610 may be to transmit, to the eNB, an indication of which frequencies the UE can receive.

In embodiments where the electronic device circuitry 600 is an eNB and/or a network node, or is incorporated into or is otherwise part of an eNB and/or a network node, the transmit circuitry 610 may be to transmit to a carrier aggregation (CA)-enabled user equipment (UE) of a long term evolution (LTE) network, an indication of a plurality of frequencies on which respective portions of an enhanced multimedia broadcast multicast service (eMBMS) temporary mobile group identity (TMGI) may be transmitted. The receive circuitry 612 may be to receive, from the UE based on the transmitting, an indication of two or more frequencies of the plurality of frequencies on which the UE may receive the portions. The control circuitry 614 may be to facilitate transmission of portions of the eMBMS TMGI on the two or more frequencies.

Figure 7:
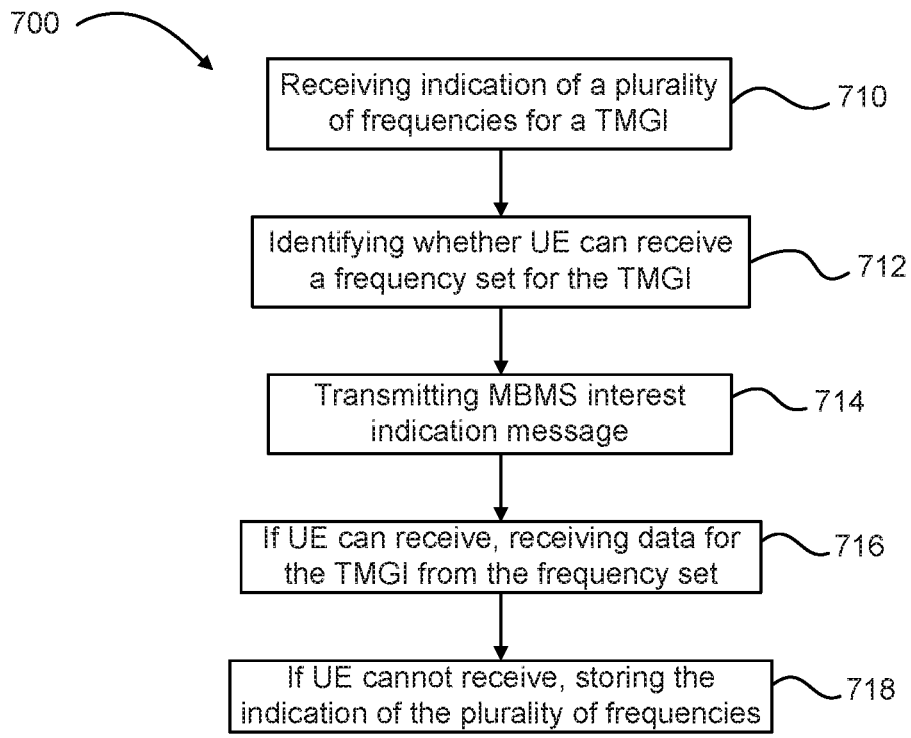
FIG. 7 is a flowchart of a method for aggregating an eMBMS service over multiple frequency carriers according to one embodiment.

In certain embodiments, the electronic device circuitry 600 shown in FIG. 6 is operable to perform one or more methods, such as the methods shown in FIG. 7. FIG. 7 is a flowchart of a method 700 for aggregating an eMBMS service over multiple frequency carriers according to one embodiment. The method 700 may be performed by a UE, and includes receiving 710 an indication of a plurality of frequencies for a TMGI. The method 700 further includes identifying 712 whether the UE can receive a frequency set for the TMGI, and transmitting 714 an MBMS interest indication message. In certain embodiments, the magnitude of the set may be 1. In other embodiments, the magnitude of the set is greater than 1. The MBMS interest indication message may include a list of frequencies that the UE prefers or through which the UE is able to receive the TMGI. If the UE can receive the frequency set for the TMGI, the method 700 includes receiving 716 data for the TMGI from the frequency set. However, if the UE cannot receive the frequency set for the TMGI, the method 700 includes storing 718 the indication of the plurality of frequencies.

Figure 8:
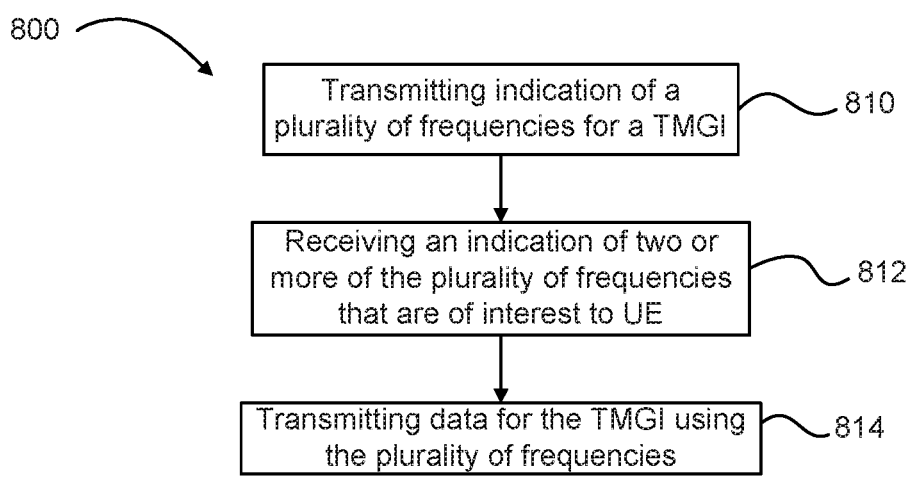
FIG. 8 is a flowchart of a method for an eMBMS service provided over multiple frequency carriers according to one embodiment.

In certain embodiments, the electronic device circuitry 600 shown in FIG. 6 is operable to perform one or more methods, such as the methods shown in FIG. 8. FIG. 8 is a flowchart of a method 800 for an eMBMS service provided over multiple frequency carriers according to one embodiment. The method 800 may be performed by one or more network nodes, such as a BM-SC, an MCE, and/or an eNB. The method 800 includes transmitting 810 an indication of a plurality of frequencies for a TMGI, receiving 812 an indication of two or more of the plurality of frequencies that are of interest to a UE, and transmitting 814 data for the TMGI using the plurality of frequencies.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 9:
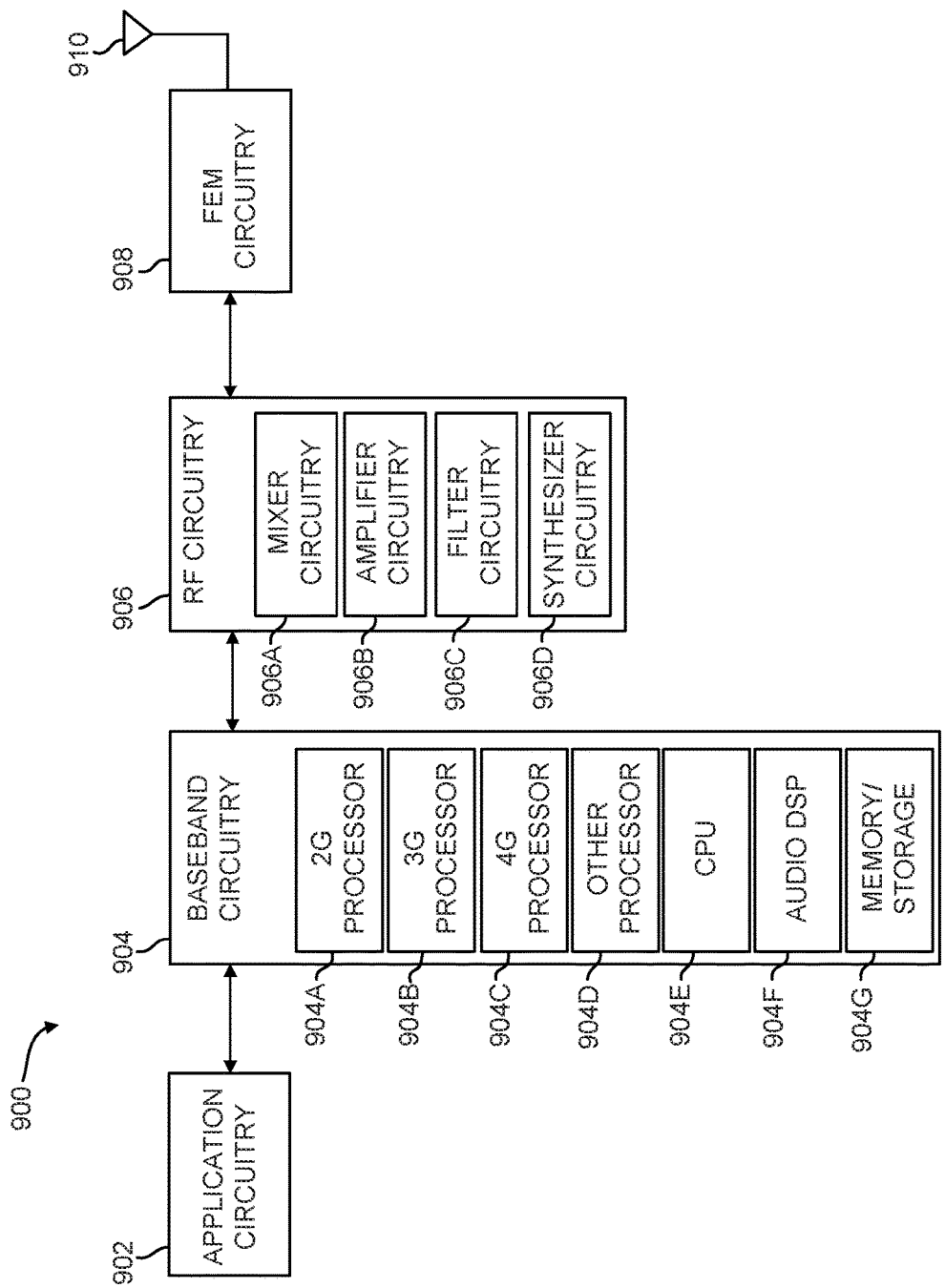
FIG. 9 is a block diagram illustrating, for one embodiment, example components of a user equipment (UE) device.

Embodiments described herein may be implemented into a system using any suitably configured hardware and/or software. FIG. 9 is a block diagram illustrating, for one embodiment, example components of a user equipment (UE) device 900. In some embodiments, the UE device 900 may include application circuitry 902, baseband circuitry 904, Radio Frequency (RF) circuitry 906, front-end module (FEM) circuitry 908, and one or more antennas 910, coupled together at least as shown in FIG. 9.

The application circuitry 902 may include one or more application processors. By way of non-limiting example, the application circuitry 902 may include one or more single-core or multi-core processors. The processor(s) may include any combination of general-purpose processors and dedicated processors (e.g., graphics processors, application processors, etc.). The processor(s) may be operably coupled and/or include memory/storage, and may be configured to execute instructions stored in the memory/storage to enable various applications and/or operating systems to run on the system.

By way of non-limiting example, the baseband circuitry 904 may include one or more single-core or multi-core processors. The baseband circuitry 904 may include one or more baseband processors and/or control logic. The baseband circuitry 904 may be configured to process baseband signals received from a receive signal path of the RF circuitry 906. The baseband 904 may also be configured to generate baseband signals for a transmit signal path of the RF circuitry 906. The baseband processing circuitry 904 may interface with the application circuitry 902 for generation and processing of the baseband signals, and for controlling operations of the RF circuitry 906.

By way of non-limiting example, the baseband circuitry 904 may include at least one of a second generation (2G) baseband processor 904A, a third generation (3G) baseband processor 904B, a fourth generation (4G) baseband processor 904C, other baseband processor(s) 904D for other existing generations, and generations in development or to be developed in the future (e.g., fifth generation (5G), 6G, etc.). The baseband circuitry 904 (e.g., at least one of baseband processors 904A-904D) may handle various radio control functions that enable communication with one or more radio networks via the RF circuitry 906. By way of non-limiting example, the radio control functions may include signal modulation/demodulation, encoding/decoding, radio frequency shifting, other functions, and combinations thereof. In some embodiments, modulation/demodulation circuitry of the baseband circuitry 904 may be programmed to perform Fast-Fourier Transform (FFT), precoding, constellation mapping/demapping functions, other functions, and combinations thereof. In some embodiments, encoding/decoding circuitry of the baseband circuitry 904 may be programmed to perform convolutions, tail-biting convolutions, turbo, Viterbi, Low Density Parity Check (LDPC) encoder/decoder functions, other functions, and combinations thereof. Embodiments of modulation/demodulation and encoder/decoder functions are not limited to these examples, and may include other suitable functions.

In some embodiments, the baseband circuitry 904 may include elements of a protocol stack. By way of non-limiting example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 904E of the baseband circuitry 904 may be programmed to run elements of the protocol stack for signaling of the PHY, MAC, RLC, PDCP and/or RRC layers. In some embodiments, the baseband circuitry 904 may include one or more audio digital signal processor(s) (DSP) 904F. The audio DSP(s) 904F may include elements for compression/decompression and echo cancellation. The audio DSP(s) 904F may also include other suitable processing elements.

The baseband circuitry 904 may further include memory/storage 904G. The memory/storage 904G may include data and/or instructions for operations performed by the processors of the baseband circuitry 904 stored thereon. In some embodiments, the memory/storage 904G may include any combination of suitable volatile memory and/or non-volatile memory. The memory/storage 904G may also include any combination of various levels of memory/storage including, but not limited to, read-only memory (ROM) having embedded software instructions (e.g., firmware), random access memory (e.g., dynamic random access memory (DRAM)), cache, buffers, etc. In some embodiments, the memory/storage 904G may be shared among the various processors or dedicated to particular processors.

Components of the baseband circuitry 904 may be suitably combined in a single chip, a single chipset, or disposed on a same circuit board in some embodiments. In some embodiments, some or all of the constituent components of the baseband circuitry 904 and the application circuitry 902 may be implemented together, such as, for example, on a system on a chip (SOC).

In some embodiments, the baseband circuitry 904 may provide for communication compatible with one or more radio technologies. For example, in some embodiments, the baseband circuitry 904 supports communication with an evolved universal terrestrial radio access network (EU-TRAN) and may also support communication with other wireless metropolitan area networks (WMAN), a wireless local area network (WLAN), a wireless personal area network (WPAN). Embodiments in which the baseband circuitry 904 is configured to support radio communications of more than one wireless protocol may be referred to as multi-mode baseband circuitry.

The RF circuitry 906 may enable communication with wireless networks using modulated electromagnetic radiation through a non-solid medium. In various embodiments, the RF circuitry 906 may include switches, filters, amplifiers, etc. to facilitate the communication with the wireless network. The RF circuitry 906 may include a receive signal path which may include circuitry to down-convert RF signals received from the FEM circuitry 908, and provide baseband signals to the baseband circuitry 904. The RF circuitry 906 may also include a transmit signal path which may include circuitry to up-convert baseband signals provided by the baseband circuitry 904, and provide RF output signals to the FEM circuitry 908 for transmission.

In some embodiments, the RF circuitry 906 may include a receive signal path and a transmit signal path. The receive signal path of the RF circuitry 906 may include mixer circuitry 906A, amplifier circuitry 906B, and filter circuitry 906C. The transmit signal path of the RF circuitry 906 may include filter circuitry 906C and mixer circuitry 906A. The RF circuitry 906 may further include synthesizer circuitry 906D configured to synthesize a frequency for use by the mixer circuitry 906A of the receive signal path and the transmit signal path. In some embodiments, the mixer circuitry 906A of the receive signal path may be configured to down-convert RF signals received from the FEM circuitry 908 based on the synthesized frequency provided by synthesizer circuitry 906D. The amplifier circuitry 906B may be configured to amplify the down-converted signals.

The filter circuitry 906C may include a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may include zero-frequency baseband signals, although this is not a requirement. In some embodiments, the mixer circuitry 906A of the receive signal path may comprise passive mixers, although the scope of the embodiments is not limited in this respect.

In some embodiments, the mixer circuitry 906A of the transmit signal path may be configured to up-convert input baseband signals based on the synthesized frequency provided by the synthesizer circuitry 906D to generate RF output signals for the FEM circuitry 908. The baseband signals may be provided by the baseband circuitry 904 and may be filtered by filter circuitry 906C. The filter circuitry 906C may include a low-pass filter (LPF), although the scope of the embodiments is not limited in this respect.

In some embodiments, the mixer circuitry 906A of the receive signal path and the mixer circuitry 906A of the transmit signal path may include two or more mixers, and may be arranged for quadrature downconversion and/or upconversion, respectively. In some embodiments, the mixer circuitry 906A of the receive signal path and the mixer circuitry 906A of the transmit signal path may include two or more mixers and may be arranged for image rejection (e.g., Hartley image rejection). In some embodiments, the mixer circuitry 906A of the receive signal path and the mixer circuitry 906A may be arranged for direct downconversion and/or direct upconversion, respectively. In some embodiments, the mixer circuitry 906A of the receive signal path and the mixer circuitry 906A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In such embodiments, the RF circuitry 906 may include analog-to-digital converter (ADC) and digital-to-analog converter (DAC) circuitry, and the baseband circuitry 904 may include a digital baseband interface to communicate with the RF circuitry 906.

In some dual-mode embodiments, separate radio IC circuitry may be provided for processing signals for each spectrum, although the scope of the embodiments is not limited in this respect.

In some embodiments, the synthesizer circuitry 906D may include one or more of a fractional-N synthesizer and a fractional N/N+1 synthesizer, although the scope of the embodiments is not limited in this respect as other types of frequency synthesizers may be suitable. For example, synthesizer circuitry 906D may include a delta-sigma synthesizer, a frequency multiplier, a synthesizer comprising a phase-locked loop with a frequency divider, other synthesizers and combinations thereof.

The synthesizer circuitry 906D may be configured to synthesize an output frequency for use by the mixer circuitry 906A of the RF circuitry 906 based on a frequency input and a divider control input. In some embodiments, the synthesizer circuitry 906D may be a fractional N/N+1 synthesizer.

In some embodiments, frequency input may be provided by a voltage controlled oscillator (VCO), although that is not a requirement. Divider control input may be provided by either the baseband circuitry 904 or the applications processor 902 depending on the desired output frequency. In some embodiments, a divider control input (e.g., N) may be determined from a look-up table based on a channel indicated by the applications processor 902.

The synthesizer circuitry 906D of the RF circuitry 906 may include a divider, a delay-locked loop (DLL), a multiplexer and a phase accumulator. In some embodiments, the divider may include a dual modulus divider (DMD), and the phase accumulator may include a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In such embodiments, the delay elements may be configured to break a VCO period up into Nd equal packets of phase, where Nd is the number of delay elements in the delay line. In this way, the DLL may provide negative feedback to help ensure that the total delay through the delay line is one VCO cycle.

In some embodiments, the synthesizer circuitry 906D may be configured to generate a carrier frequency as the output frequency. In some embodiments, the output frequency may be a multiple of the carrier frequency (e.g., twice the carrier frequency, four times the carrier frequency, etc.) and used in conjunction with a quadrature generator and divider circuitry to generate multiple signals at the carrier frequency with multiple different phases with respect to each other. In some embodiments, the output frequency may be a LO frequency (fLO). In some embodiments, the RF circuitry 906 may include an IQ/polar converter.

The FEM circuitry 908 may include a receive signal path which may include circuitry configured to operate on RF signals received from one or more antennas 910, amplify the received signals, and provide the amplified versions of the received signals to the RF circuitry 906 for further processing. The FEM circuitry 908 may also include a transmit signal path which may include circuitry configured to amplify signals for transmission provided by the RF circuitry 906 for transmission by at least one of the one or more antennas 910.

In some embodiments, the FEM circuitry 908 may include a TX/RX switch configured to switch between a transmit mode and a receive mode operation. The FEM circuitry 908 may include a receive signal path and a transmit signal path. The receive signal path of the FEM circuitry 908 may include a low-noise amplifier (LNA) to amplify received RF signals and provide the amplified received RF signals as an output (e.g., to the RF circuitry 906). The transmit signal path of the FEM circuitry 908 may include a power amplifier (PA) configured to amplify input RF signals (e.g., provided by RF circuitry 906), and one or more filters configured to generate RF signals for subsequent transmission (e.g., by one or more of the one or more antennas 910.

In some embodiments, the UE device 900 may include additional elements such as, for example, memory/storage, a display, a camera, one of more sensors, an input/output (I/O) interface, other elements, and combinations thereof.

In some embodiments, the UE device 900 may be configured to perform one or more processes, techniques, and/or methods as described herein, or portions thereof.

Examples

The following examples pertain to further embodiments.

Example 1 is a user equipment (UE) configured for carrier aggregation. The UE includes receive circuitry to receive, from an evolved NodeB (eNB) of a long term evolution (LTE) network, an indication of a plurality of frequencies on which respective portions of an enhanced multimedia broadcast multicast service (eMBMS) are transmitted. The UE also includes control circuitry coupled with the receive circuitry. The control circuitry is to identify whether the UE can receive the eMBMS through two or more frequencies of the plurality of frequencies. If the UE can receive the eMBMS, the control circuitry is to aggregate the respective portions of the eMBMS received through the two or more frequencies. If the UE cannot receive the eMBMS, the control circuitry is to store the indication of the plurality of frequencies.

Example 2 includes the UE of Example 1, and further includes transmit circuitry coupled with the control circuitry. The transmit circuitry is to transmit, to the eNB, an indication of a preference of the UE to receive the eMBMS corresponding to a temporary mobile group identity (TMGI) through a set of frequencies of the plurality of frequencies.

Example 3 includes the UE of Example 1, wherein the indication of the preference of the UE includes an indication that at least two of the set of frequencies are to be bundled.

Example 4 includes the UE of any of Examples 1-3, and further includes middleware. The indication of the plurality of frequencies includes a service announcement processed by the middleware.

Example 5 includes the UE of any of Examples 1-3, wherein the indication of the plurality of frequencies is received through in a multicast control channel (MCCH).

Example 6 includes the UE of Example 5, wherein the receive circuitry is further to receive eMBMS data packets on an access stratum.

Example 7 includes the UE of Example 6, wherein the eMBMS data packets are aggregated according to radio link control (RLC) segmentation, RLC re-segmentation, and/or a re-ordering window.

Example 8 includes the UE of any of Examples 1-7, wherein to identify whether the UE can receive the eMBMS through two or more frequencies of the plurality of frequencies, the control circuitry compares the plurality of frequencies to frequency information in a system information block (SIB) message.

Example 9 includes the UE of Example 8, wherein the SIB message is a SIB-15 message received by the UE at power on, and wherein the SIB-15 message includes information to support eMBMS including one or more service area identifier (SAI) and aggregation dependencies.

Example 10 includes the UE of any of Examples 1-9, wherein respective frequencies of the plurality of frequencies relate to a primary cell (PCell), a secondary cell (SCell), or neighbor cell (NCell).

Example 11 is a node in a wireless network that includes one or more processors and at least one computer-readable storage medium having stored thereon instructions that, when executed by the one or more processors, cause the one or more processors to perform operations. The operations are to provide, to a user equipment (UE), one or more frequency set to support a temporary mobile group identity (TMGI), each frequency set including a list of dependent frequency carriers corresponding to respective parts of the TMGI. The operations are also to receive assistance information including an indication of a plurality of frequencies of interest to the UE, and facilitate transmission of data for the TMGI using the one or more frequency set.

Example 12 includes the node of Example 11, wherein the assistance information further includes an indication of dependent frequency carriers to bundle.

Example 13 includes the node of Example 12, wherein the operations further comprise use the assistance information to decide whether to keep the plurality of frequencies of interest available to the UE.

Example 14 includes the node of any of Examples 11-13, wherein the node includes a broadcast multicast service center (BM-SC) configured to receive, from a content provider, data for an enhanced multimedia broadcast multicast service (eMBMS) corresponding to the TMGI. The BM-SC is also to generate a service announcement including the one or more frequency set, and provide the service announcement to the UE through an evolved NodeB (eNB) of a long term evolution (LTE) system.

Example 15 includes the node of any of Examples 11-13, wherein the node includes at least one of a multicast coordination entity and an evolved NodeB (eNB) of a long term evolution (LTE) system.

Example 16 includes the node of any of Examples 11-13, wherein the node is configured to provide the one or more frequency set to the UE through an access stratum.

Example 17 includes the node of Example 16, wherein the one or more frequency set is included in a multicast control channel (MCCH).

Example 18 includes the node of Example 16, wherein to facilitate transmission of the data for the TMGI using the one or more frequency set, the node applies radio link control (RLC) segmentation, RLC re-segmentation, and/or a re-ordering window.

Example 19 includes the node of any of Examples 11-19, wherein the one or more frequency set includes a plurality of frequencies corresponding to two or more of a primary cell (PCell), secondary cell (SCell), or neighbor cell (NCell).

Example 20 is an apparatus of a user equipment (UE) that includes logic, at least a portion of which includes circuitry. The logic is to determine a plurality of available cells in a wireless network through which respective portions of a multicast service are broadcast, connect to the plurality of available cells, and aggregate data from the plurality of available cells to receive the multicast service.

Example 21 includes the apparatus of Example 20, wherein the circuitry includes application processor circuitry to process a service announcement from the wireless network including an indication of a plurality of frequencies of a temporary mobile group identity (TMGI) corresponding to the multicast service. Based on the plurality of frequencies and frequency information in a system information block (SIB) message, the application processor circuitry is also to determine the plurality of available cells in the wireless network through which the respective portions of the multicast service are broadcast.

Example 22 includes the apparatus of Example 20, wherein the circuitry includes baseband processor circuitry to process a multicast control channel (MCCH) received from the wireless network including an indication of a plurality of frequencies of a temporary mobile group identity (TMGI) corresponding to the multicast service. Based on the plurality of frequencies and frequency information in a system information block (SIB) message, the baseband processor circuitry is also to determine the plurality of available cells in the wireless network through which the respective portions of the multicast service are broadcast.

Example 23 includes the apparatus of any of Examples 20-22, wherein the logic is further to aggregate the data from the plurality of available cells according to radio link control (RLC) segmentation, RLC re-segmentation, or a re-ordering window.

Example 24 includes the apparatus of any of Examples 20-23, wherein the plurality of cells include two or more cells of a primary cell (PCell), a secondary cell (SCell), and neighbor cell (NCell).

Example 25 includes the apparatus of any of Examples 20-24, wherein the logic is further to send a multimedia broadcast multicast service interest indication message to the wireless network to indicate which frequencies can be received by the UE.

Example 26 is a method for aggregating an enhanced multimedia broadcast multicast service (eMBMS) over multiple frequency carriers. The method includes: receiving, from a base station, an indication of a plurality of frequencies on which respective portions of an eMBMS are transmitted; identifying whether a user equipment (UE) can receive the eMBMS through two or more frequencies of the plurality of frequencies; aggregating, if the UE can receive the eMBMS, the respective portions of the eMBMS received through the two or more frequencies; and storing, if the UE cannot receive the eMBMS, the indication of the plurality of frequencies.

Example 27 includes the method of Example 26, further including transmitting, to the base station, an indication of a preference of the UE to receive the eMBMS corresponding to a temporary mobile group identity (TMGI) through a set of frequencies of the plurality of frequencies.

Example 28 includes the method Examples 26, wherein the indication of the preference of the UE includes an indication that at least two of the set of frequencies are to be bundled.

Example 29 includes the method of any of Examples 26-28, wherein the indication of the plurality of frequencies includes a service announcement.

Example 30 includes the method of any of Examples 26-28, wherein the indication of the plurality of frequencies is received through in a multicast control channel (MCCH).

Example 31 includes the method of Example 30, further including receiving eMBMS data packets on an access stratum.

Example 32 includes the method of Example 31, further including aggregating the eMBMS data packets are aggregated according to radio link control (RLC) segmentation, RLC re-segmentation, and/or a re-ordering window.

Example 33 includes the method of any of Examples 26-32, wherein to identify whether the UE can receive the eMBMS through two or more frequencies of the plurality of frequencies, the method further includes comparing the plurality of frequencies to frequency information in a system information block (SIB) message.

Example 34 includes the method of Example 33, wherein the SIB message is a SIB-15 message received by the UE at power on, and wherein the SIB-15 message includes information to support eMBMS including one or more service area identifier (SAI) and aggregation dependencies.

Example 35 includes the method of any of Examples 26-34, wherein respective frequencies of the plurality of frequencies relate to a primary cell (PCell), a secondary cell (SCell), or neighbor cell (NCell).

Example 36 is a method, including: providing, to a user equipment (UE), one or more frequency set to support a temporary mobile group identity (TMGI), each frequency set including a list of dependent frequency carriers corresponding to respective parts of the TMGI; receiving assistance information including an indication of a plurality of frequencies of interest to the UE; and facilitating transmission of data for the TMGI using the one or more frequency set.

Example 37 includes the method of Example 36, wherein the assistance information further includes an indication of dependent frequency carriers to bundle.

Example 38 includes the method of Example 37, further including using the assistance information to decide whether to keep the plurality of frequencies of interest available to the UE.

Example 39 includes the method of any of Examples 36-38, further including: receiving, from a content provider, data for an enhanced multimedia broadcast multicast service (eMBMS) corresponding to the TMGI; generating a service announcement including the one or more frequency set; and providing the service announcement to the UE through an evolved NodeB (eNB) of a long term evolution (LTE) system.

Example 40 includes the method of any of Examples 36-38, further including providing the one or more frequency set to the UE through an access stratum.

Example 41 includes the method of Example 40, wherein the one or more frequency set is included in a multicast control channel (MCCH).

Example 42 includes the method of Example 40, wherein to facilitate transmission of the data for the TMGI using the one or more frequency set, the method further includes applying radio link control (RLC) segmentation, RLC re-segmentation, and/or a re-ordering window.

Example 43 includes the method of any of Examples 36-42, wherein the one or more frequency set includes a plurality of frequencies corresponding to two or more of a primary cell (PCell), secondary cell (SCell), or neighbor cell (NCell).

Example 44 is a method for a user equipment in a communication system, including: determining a plurality of available cells in a wireless network through which respective portions of a multicast service are broadcast; connecting to the plurality of available cells; and aggregating data from the plurality of available cells to receive the multicast service.

Example 45 includes the method of Example 44, further including: processing a service announcement from the wireless network including an indication of a plurality of frequencies of a temporary mobile group identity (TMGI) corresponding to the multicast service; and based on the plurality of frequencies and frequency information in a system information block (SIB) message, determining the plurality of available cells in the wireless network through which the respective portions of the multicast service are broadcast.

Example 46 includes the method of Example 44, further including: processing a multicast control channel (MCCH) received from the wireless network including an indication of a plurality of frequencies of a temporary mobile group identity (TMGI) corresponding to the multicast service; and based on the plurality of frequencies and frequency information in a system information block (SIB) message, determining the plurality of available cells in the wireless network through which the respective portions of the multicast service are broadcast.

Example 47 includes the method of any of Examples 44-46, further including aggregating the data from the plurality of available cells according to radio link control (RLC) segmentation, RLC re-segmentation, or a re-ordering window.

Example 48 includes the method of any of Examples 44-47, wherein the plurality of cells include two or more cells of a primary cell (PCell), a secondary cell (SCell), and neighbor cell (NCell).

Example 49 includes the method of any of Examples 44-48, further including sending a multimedia broadcast multicast service interest indication message to the wireless network to indicate which frequencies can be received by the UE.

Example 50 is at least one computer-readable storage medium having stored thereon computer-readable instructions, when executed, to implement a method as recited in any of Examples 26-49.

Example 51 is an apparatus including means to perform a method as recited in any of Examples 26-49.

Some of the infrastructure that can be used with embodiments disclosed herein is already available, such as general-purpose computers, mobile phones, computer programming tools and techniques, digital storage media, and communications networks. A computing device may include a processor such as a microprocessor, microcontroller, logic circuitry, or the like. The computing device may include a computer-readable storage device such as non-volatile memory, static random access memory (RAM), dynamic RAM, read-only memory (ROM), disk, tape, magnetic, optical, flash memory, or other computer-readable storage medium.

Various aspects of certain embodiments may be implemented using hardware, software, firmware, or a combination thereof. A component or module may refer to, be part of, or include an application specific integrated circuit (ASIC), an electronic circuit, a processor (shared, dedicated, or group), and/or memory (shared, dedicated or group) that execute one or more software or firmware programs, a combinational logic circuit, and/or other suitable components that provide the described functionality. As used herein, a software module or component may include any type of computer instruction or computer executable code located within or on a non-transitory computer-readable storage medium. A software module or component may, for instance, comprise one or more physical or logical blocks of computer instructions, which may be organized as a routine, program, object, component, data structure, etc., which performs one or more tasks or implements particular abstract data types.

In certain embodiments, a particular software module or component may comprise disparate instructions stored in different locations of a computer-readable storage medium, which together implement the described functionality of the module or component. Indeed, a module or component may comprise a single instruction or many instructions, and may be distributed over several different code segments, among different programs, and across several computer-readable storage media. Some embodiments may be practiced in a distributed computing environment where tasks are performed by a remote processing device linked through a communications network.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the embodiments are not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. A user equipment (UE) configured for carrier aggregation, comprising:
   receive circuitry to receive, from an evolved NodeB (eNB) of a long term evolution (LTE) network, an indication of a plurality of frequencies on which respective portions of an enhanced multimedia broadcast multicast service (eMBMS) are transmitted;
   control circuitry coupled with the receive circuitry, the control circuitry to:
   identify whether the UE can receive the eMBMS through two or more frequencies of the plurality of frequencies;
   if the UE can receive the eMBMS, aggregate the respective portions of the eMBMS received through the two or more frequencies; and if the UE cannot receive the eMBMS; and
store the indication of the plurality of frequencies; and
later attempt to receive information on the plurality of frequencies corresponding to the stored indication; and
transmit circuitry coupled with the control circuitry, the transmit circuitry to transmit, to the eNB, an indication of a preference of the UE to receive the eMBMS corresponding to a temporary mobile group identity (TMGI) through a set of frequencies of the plurality of frequencies.

2. The UE of claim 1, wherein the indication of the preference of the UE includes an indication that at least two of the set of frequencies are to be bundled.

3. The UE of claim 1, further comprising middleware, wherein the indication of the plurality of frequencies comprises a service announcement processed by the middleware.

4. The UE of claim 1, wherein the indication of the plurality of frequencies is received through in a multicast control channel (MCCH).

5. The UE of claim 4, wherein the receive circuitry is further to receive eMBMS data packets on an access stratum.

6. The UE of claim 5, wherein the eMBMS data packets are aggregated according to radio link control (RLC) segmentation, RLC re-segmentation, and/or a re-ordering window.

7. The UE of claim 1, wherein to identify whether the UE can receive the eMBMS through two or more frequencies of the plurality of frequencies, the control circuitry compares the plurality of frequencies to frequency information in a system information block (SIB) message.

8. The UE of claim 7, wherein the SIB message is a SIB-15 message received by the UE at power on, and wherein the SIB-15 message includes information to support eMBMS comprising one or more service area identifier (SAI) and aggregation dependencies.

9. The UE of claim 1, wherein respective frequencies of the plurality of frequencies relate to a primary cell (PCell), a secondary cell (SCell), or neighbor cell (NCell).

* * * * *